No. 670,948. Patented Apr. 2, 1901.
A. G. CARLSON.
BRAKE FOR VEHICLES.
(Application filed May 19, 1899.)
(No Model.) 3 Sheets—Sheet 1.
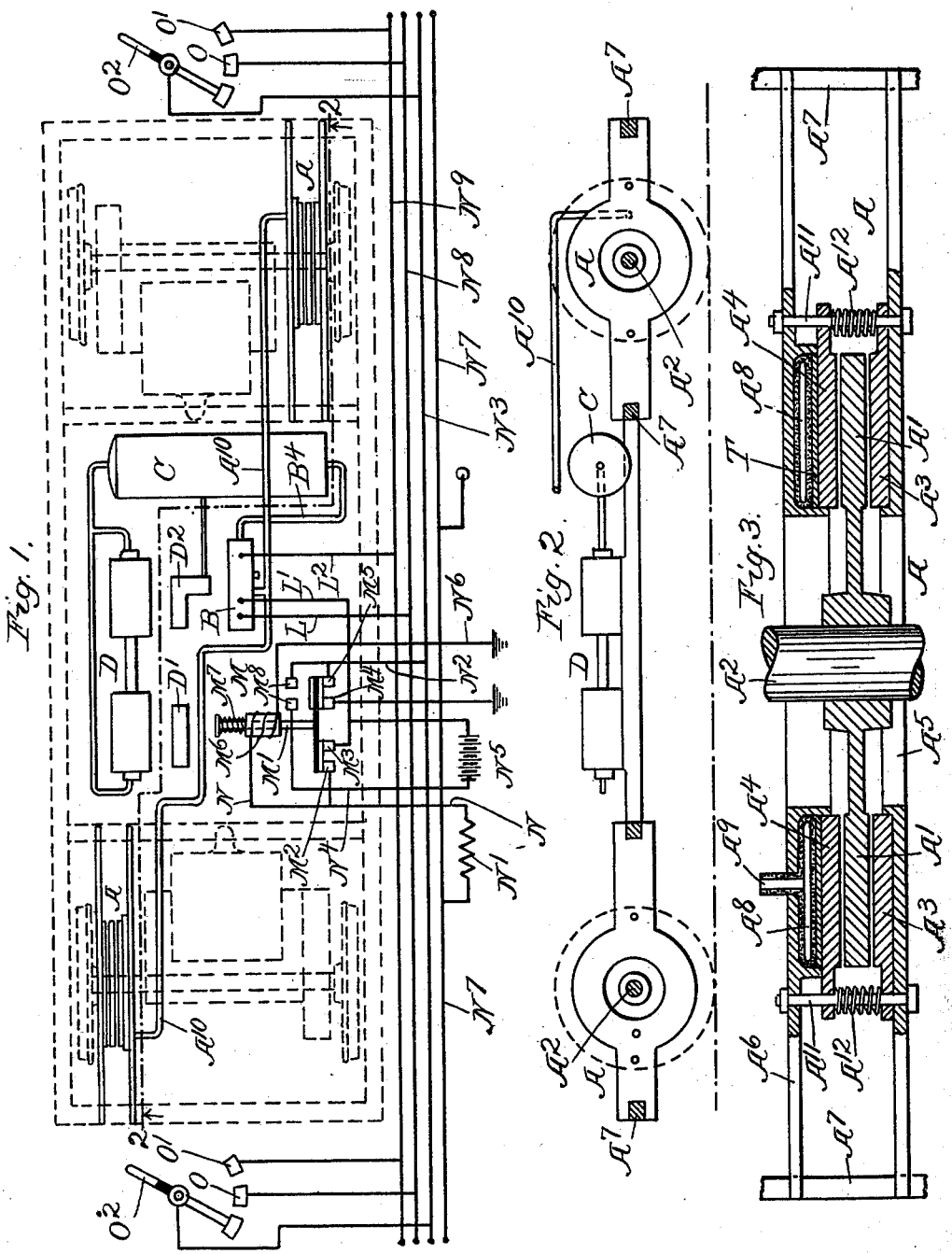
Witnesses
Edward T. Wray.
Homer L. Kraft.
Inventor
Adolph G. Carlson No. 670,948. Patented Apr. 2, 1901.
A. G. CARLSON.
BRAKE FOR VEHICLES.
(Application filed May 19, 1899.)
(No Model.) 3 Sheets—Sheet 2.
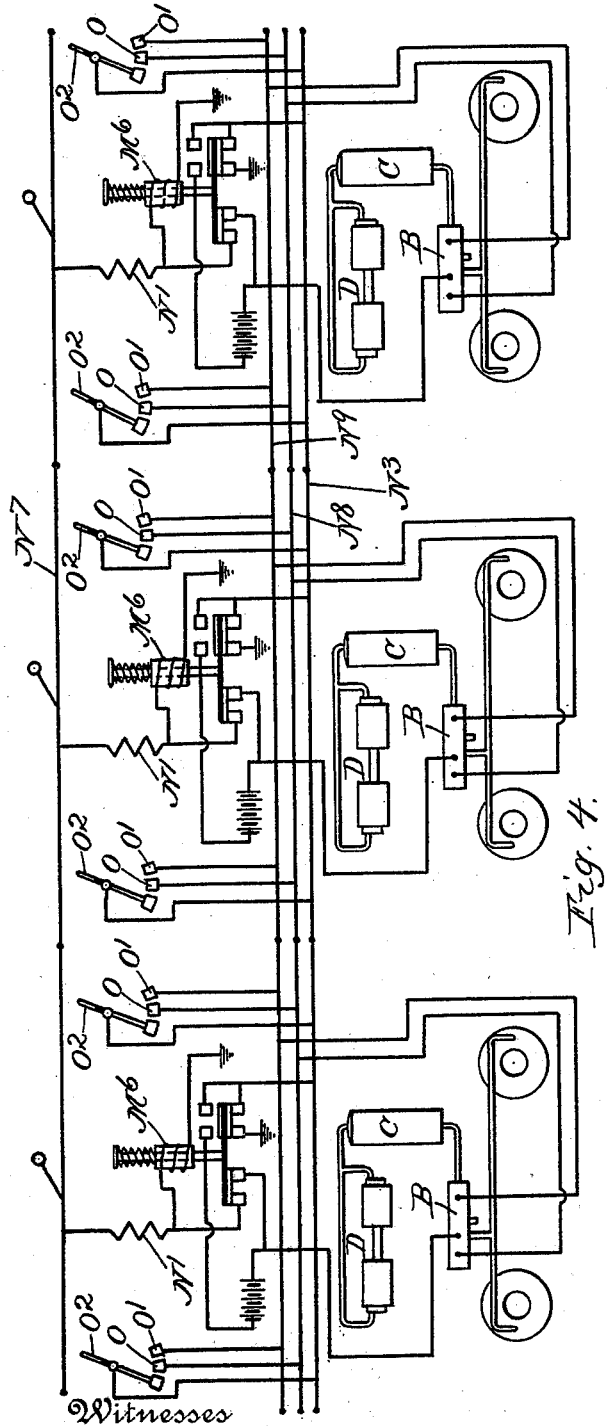
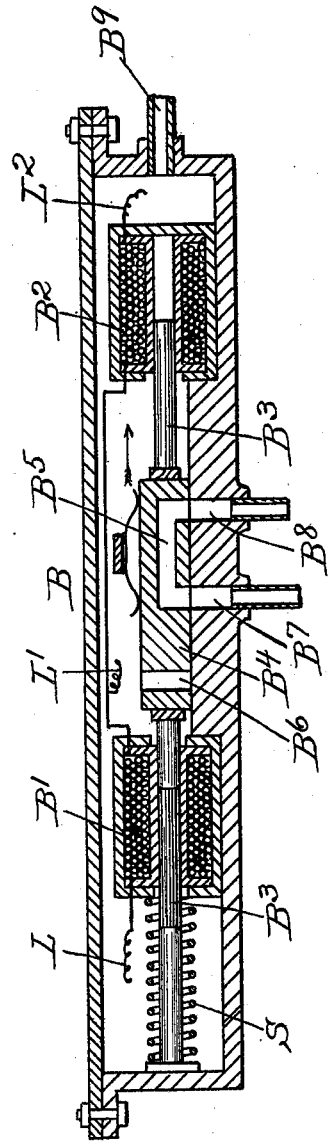
Witnesses
Edward T. Wray,
Homer L. Kraft
Inventor
Adolph G. Carlson No. 670,948.  
A. G. CARLSON.  
BRAKE FOR VEHICLES.  
(Application filed May 19, 1899.)  
(No Model.)  
Patented Apr. 2, 1901.  
3 Sheets—Sheet 3.
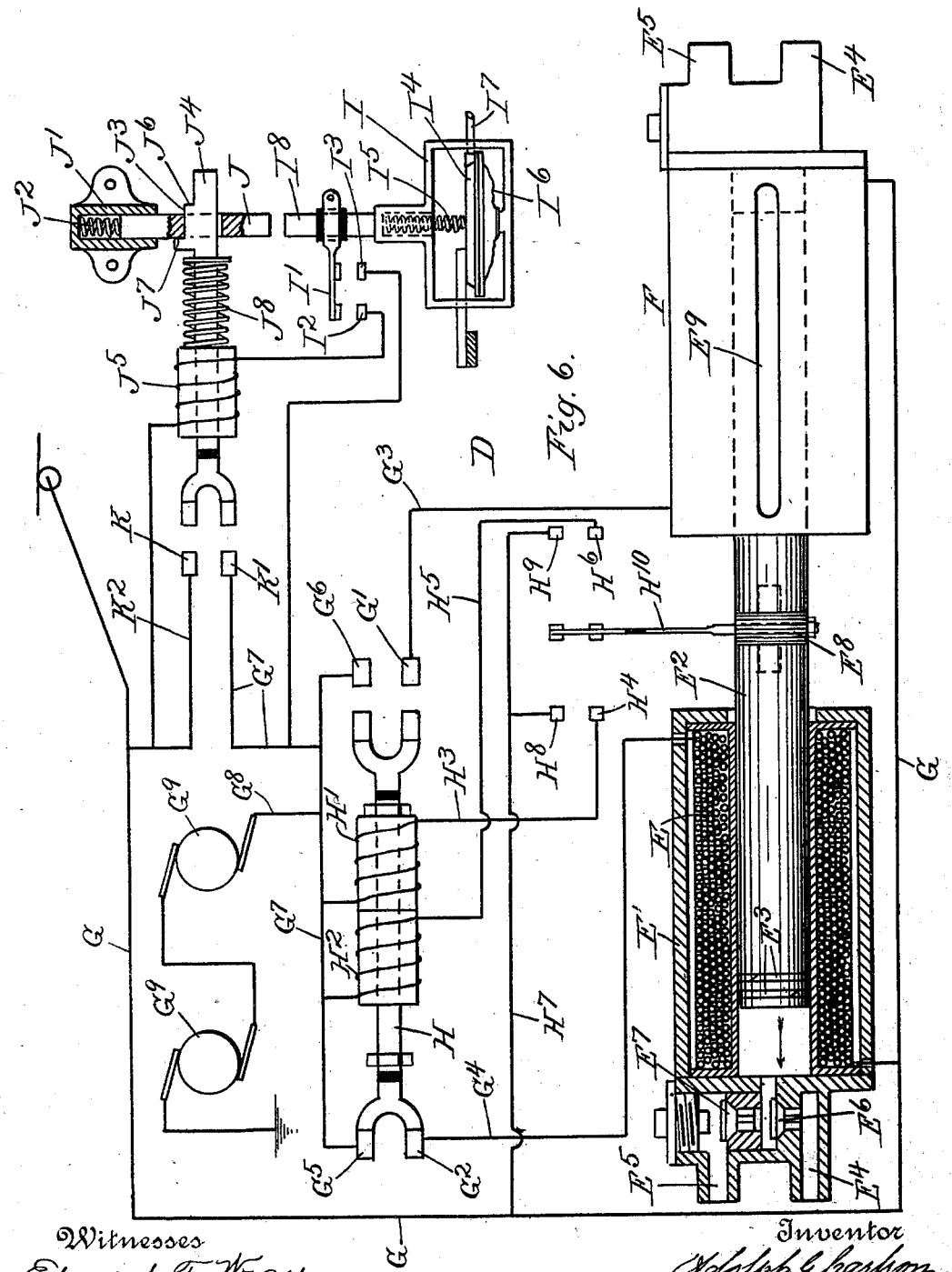
Witnesses  
Edward T. Wray  
Homer L. Kraft  
Inventor  
Adolph G. Carlson

UNITED STATES PATENT OFFICE.

ADOLPH G. CARLSON, OF CHICAGO, ILLINOIS.

BRAKE FOR VEHICLES.

SPECIFICATION forming part of Letters Patent No. 670,948, dated April 2, 1901.

Application filed May 19, 1899. Serial No. 717,400. (No model.)

*To all whom it may concern:*

Be it known that I, ADOLPH G. CARLSON, a citizen of the United States, residing at Chicago, in the county of Cook and State of Illinois, have invented a certain new and useful Improvement in Brakes for Vehicles, of which the following is a specification.

My invention relates to brakes for vehicles, and has for its object to provide a new and improved brake for this purpose, of which the following is a description, reference being had to the accompanying drawings, wherein—

Figure 1 is a diagrammatic view showing a brake mechanism embodying my invention in position upon the car, the parts of the car being shown in dotted lines. Fig. 2 is a section on line 2 2, Fig. 1, with parts omitted. Fig. 3 is an enlarged view, in part section, showing the construction of the frictional engaging parts of the brake. Fig. 4 is a diagrammatic view of the connections when several cars are used in a train. Fig. 5 is a sectional view of the controlling-valve mechanism by which the admission of the fluid which operates the brakes is controlled. Fig. 6 is a diagrammatic view showing the pumping device used in connection with the brake.

Like letters refer to like parts throughout the several figures.

The brake mechanism herein shown is particularly adapted for a system wherein each car has its own independent brake mechanism which can be controlled from either end or platform, the arrangement being such that when several cars are connected together in the train the brake mechanism on each car can either be controlled independently or they can all be actuated or controlled simultaneously from any one of the cars.

Referring now to Fig. 1, I have shown a general plan wherein the relation and position of the several parts associated with one car are indicated diagrammatically. In this view the engaging parts A of the brake, by means of which the braking effect is directly produced, are associated with the axles of the car. The construction of these engaging parts is shown in Fig 3. In this figure a fixed part $A'$ on the axle is interposed between suitable engaging parts or shoes $A^3 A^4$. These brake-shoes are mounted upon suitable supports $A^5 A^6$, which are supported upon the part $A^7$ on the car. The brake-shoe $A^3$ is made separable from the support $A^5$ in order that it may be easily replaced when worn. The brake-shoe $A^4$ is movably mounted upon the support $A^6$, and a receptacle $A^8$, preferably flexible, is interposed between said brake-shoe and the support. This receptacle may be of any form and construction, and, as herein shown, consists of an annular bag mounted in a suitable receiving-opening in the support $A^6$. The rods $A^{11}$, carrying springs $A^{12}$, pass through the shoe $A^4$ and supports $A^5 A^6$. A suitable admission-opening $A^9$ is associated with the receptacle $A^8$, so that the air or other fluid may be admitted thereto. This admission-opening is connected by a suitable pipe $A^{10}$ with the controlling-valve B on the car. I have shown the car as being provided with two sets of brake-shoes or engaging parts; but it is of course evident that any desired number may be used, depending upon the construction and the conditions to be met. This controlling-valve is connected with a tank C, containing the fluid used, which tank is supplied by means of an electrically-operated pumping device D, controlled by a suitable switch device $D'$. An automatic cut-out device $D^2$ is associated with the pump and tank, so as to make the operation of the pump dependent upon the pressure in the tank.

I have shown in detail the construction of the pumping device D in Fig. 6. In constructing the pumping device I provide two solenoids E F, which act as the cylinders of the pump. These solenoids are contained within the iron casings $E'$, and there is preferably left an air-space between the coils of the solenoids and said casing, said casing being also provided with holes $E^9$, so as to permit a circulation of air, and thus prevent excessive heating of the coils. A plunger $E^2$ is adapted to reciprocate within the solenoids, said plunger being provided with contacts, by which the circuits through the solenoids are varied. Each plunger is formed so as to tightly fit the opening in the solenoid. This result may be obtained by providing the ends of the plunger with the packing-rings $E^3$. Each solenoid is provided with suitable valve mechanism, so that the air may be admitted thereto and then forced into the tank C. As herein illustrated the solenoid is provided with an inlet $E^4$ and an outlet $E^5$, controlled by suitable valves $E^6$ $E^7$. The outlets $E^5$ are connected with the tank C. The two parts of the plunger are insulated from each other at $E^8$. The solenoids are connected by conductor G with the source of electric supply. In the accompanying drawings the conductor G is connected with the trolley-wheel. The coils of the solenoids are also connected with the contacts $G'$ $G^2$ by conductors $G^3$ $G^4$. Associated with the contacts $G'$ $G^2$ are the contacts $G^5$ and $G^6$, connected by conductor $G^7$. Conductor $G^8$ is connected to conductor $G^7$ and leads to the motors $G^9$. Associated with the contacts $G'$ $G^2$, &c., is a movable part H, adapted to engage the contacts $G^2$ and $G^5$ or the contacts $G'$ and $G^6$ and complete the circuit between them. The ends of this movable part are insulated from each other, and the part is operated by means of a solenoid consisting of the two coils $H'$ $H^2$, both of which are connected to conductor $G^7$. The coil $H'$ is connected by conductor $H^3$ with the contact $H^4$, while the coil $H^2$ is connected by conductor $H^5$ with the contact $H^6$. Conductor $H^7$ is provided with contacts $H^8$ $H^9$ in proximity to contacts $H^4$ and $H^6$. A contact-arm $H^{10}$ is associated with the plunger $E^2$ and is adapted to be moved to alternately complete the circuit between contacts $H^4$ and $H^8$ and $H^6$ and $H^9$. The result of this arrangement is that the movable part H is moved when the device is in circuit so as to alternately connect the solenoids E and F in circuit, and thus cause the plunger $E^2$ to reciprocate, so as to force air into the tank C. The pump is preferably provided with an automatic cut-out, which renders it inoperative after the pressure in the tank C reaches a predetermined amount. This automatic cut-out may be of any desired construction. As herein shown it consists of the movable part I, provided with the contact-arm $I'$, adapted to short-circuit the contacts $I^2$ $I^3$ when the pressure in the tank reaches a predetermined amount. This result may be obtained in any desired manner. As herein shown a fixed part $I^4$ is mounted upon the car in any suitable manner, and a spring $I^5$ is interposed between it and the movable part I. A diaphragm $I^6$ is associated with the fixed part $I^4$ and is also connected with the movable part I. A tube $I^7$ is connected with the tank C and admits air into the space between the diaphragm $I^6$ and the fixed part $I^4$. The parts are properly adjusted, so that when the pressure in the tank has reached the desired amount the movable part I will be moved, so as to short-circuit the contacts $I^2$ and $I^3$. The spring $I^5$ again moves the movable part I upward, when the pressure is reduced so as to break the circuit. Attached to the part I is an engaging piece $I^8$, opposed to the spring-actuated dog J. This dog is mounted in a suitable fixed part $J'$ and is pushed outwardly by the spring $J^2$. The dog is also provided with the engaging face $J^3$, adapted to engage the end of the plunger $J^4$, associated with the solenoid $J^5$. This plunger is also provided with the two engaging faces $J^6$ and $J^7$ and the spring $J^8$, which tends to force it toward the dog. The plunger $J^4$ passes through the solenoid $J^5$ and is provided at its ends with suitable contacts adapted to complete the circuit between the contact K, connected by conductor $K^2$ with the trolley-wheel, and the contact $K'$ connected with conductor $G^7$. The solenoid is connected to the conductor $K^2$ and to the contact $I^2$, while the contact $I^3$ is connected with the conductor $G^7$. Normally the plunger $J^4$ is in the position shown in full lines in Fig. 6, the circuit between the contacts K and $K'$ being broken. When the pressure in the tank exceeds a predetermined amount, the circuit is completed through the solenoid $J^5$, and the plunger is moved so as to short-circuit the contacts K and $K'$, and thus short-circuit the pump. When the pressure falls below a predetermined amount, the dog J is moved to release the plunger $J^4$ and the circuit again broken.

I have shown in Fig. 5 the construction of the controlling-valve B. This valve consists of two solenoids $B'$ $B^2$, provided with suitable plungers $B^3$, connected to the sliding valve $B^4$. The sliding valve is provided with the ports $B^5$ $B^6$, which coöperate with the admission-port $B^7$ and the exhaust-port $B^8$, the admission-port $B^7$ leading to the brake mechanism and the exhaust-port $B^8$ leading to the atmosphere. The casing in which the valve mechanism is contained is connected with the tank C by means of the pipe $B^9$. The solenoids are adapted to be connected in circuit, so that the current may be passed therethrough. The solenoids when energized act upon the plungers $B^3$ and move the valve $B^4$. When the valve is in the position shown in full lines in Fig. 5, the admission-port and exhaust-port are connected together, so as to permit the air to exhaust from the brake mechanism. When the current is admitted to the solenoid $B'$, the valve is moved so as to close both the exhaust and admission ports. When the current is admitted to the solenoid $B^2$, the valve is further moved to connect the admission-port with the tank C, so as to admit air to the brake mechanism. Associated with one of the plungers $B^3$ is a coiled spring S, which is compressed when the valve is moved by the solenoids. When the current through the solenoids is broken, this spring moves the valve back to the position shown in full lines, thus permitting the air to be exhausted from the brake mechanism. The solenoids are connected in circuit by means of conductors L $L'$ $L^2$. I prefer to provide a suitable switch M, located between the controlling-valve B and the source of electric supply, adapted to automatically connect the valve B with a suitable reserve battery or the like in case the current ceases to flow through the main line, thus preventing such an accident from rendering the brakes inoperative.

Referring to Fig. 1, this controlling-switch consists of the contact-arm $M'$, adapted to complete the circuit between contacts $M^2$ $M^3$ and contacts $M^4$ $M^5$. This contact-arm is operated by the solenoid $M^6$, so as to complete the circuit between said contacts. A spring $M^7$ moves the contact-arm in the opposite direction, so as to complete the circuit between contacts $M^8$. The contact $M^3$ is connected with conductor L, leading to the valve B. The contact $M^2$ is connected to conductor N, leading to the solenoid $M^6$ and the resistance $N'$. The contact $M^4$ is connected with the ground, and the contact $M^5$ is connected with conductor $N^2$, which is in turn connected to conductor $N^3$ at one end and to one of the contacts $M^8$ at the other end. The other contact $M^8$ is connected by conductor $N^4$ with one pole of the battery $N^5$, the other pole being connected to conductor $L'$. The solenoid $M^6$ is connected by conductor $N^6$ with the ground. The resistance $N'$ is connected by conductor $N^7$ with the trolley-wheel. Conductor L of the controlling-valve is connected with conductor $N^8$, while conductor $L^2$ is connected with conductor $N^9$. The conductors $N^8$ and $N^9$ are connected to suitable contacts O O' at each end of the car, while the conductor $N^3$ is connected with a movable arm $O^2$ at each end of the car, adapted to engage the contacts O and O'. This arrangement permits the brake mechanism to be controlled from either end of the car.

Referring now to Fig. 4, I have shown diagrammatically the connections and circuits for a train consisting of a series of cars, the connections being so arranged that all the brake mechanisms can be operated from either end of either car. This construction shows the mechanisms on the several cars, the mechanism of each car being connected with the conductors $N^7$, $N^3$, $N^8$, and $N^9$, said conductors extending the length of the train.

When the receptacle $A^8$, by means of which the brakes are directly set, is made of material that will be affected by heat I provide an insulating-strip T, said insulating-strip being interposed between the receptacle and the brake-shoe $A^4$, as illustrated in Fig. 3.

I have described in detail particular constructions embodying my invention, and I have shown these constructions in a diagrammatic manner in order to make my invention clear; but it is of course evident that other constructions may be used and that some of the parts may be omitted and others used with parts not herein shown without departing from the spirit of my invention. I therefore do not wish to be limited to the constructions shown.

The use and operation of my invention are as follows: If when the tank C is filled with air and the parts are arranged as shown in Fig. 1 it is desired to stop the car, the movable arm $O^2$ at either end of the car is moved so as to make contact with the contact O. If now the trolley-wheel is in contact with the trolley-wire, a circuit will be completed which will be traced as follows: from the trolley along conductor $N^7$ to the resistance $N'$, thence by conductor N to contact $M^2$. The current will here divide, and a portion of it will pass through the solenoid $M^6$ and thence to the ground and energize said solenoid, so as to connect the contacts $M^2$ $M^3$ and $M^4$ $M^5$. The current then passes from contact $M^2$ to $M^3$, thence by wire $L'$ to the controlling-valve B, thence through solenoid $B'$ of said controlling-valve, thence by conductor L to conductor $N^8$, thence through contact O, arm $O^2$, conductor $N^3$, conductor $N^2$, and contacts $M^5$ $M^4$ to the ground. The solenoid $B'$ is then energized and acts upon the plunger $B^3$, so as to move the valve $B^4$ in the direction of the arrow. This first movement of the valve is not sufficient to connect the port $B^6$ with the admission-port $B^7$, but disconnects said admission-port from the port $B^5$. If the arm $O^2$ is now moved to the contact $O'$, the circuit will be traced, as before, up to the valve B. The solenoid $B^2$ is now in circuit, and the current passes from said solenoid through conductor $L^2$, conductor $N^9$, contact $O'$, and arm $O^2$ to conductor $N^6$, from whence it passes to the ground, as before described. The solenoid $B^2$ being now energized acts upon the plungers $B^3$ and moves the valve so as to connect the ports at $B^6$ and $B^7$, thus admitting air to the receptacle $A^8$. The pressure of the air in this receptacle moves the brake-shoe $A^4$ into contact with the fixed part $A'$ on the axle. At the same time the support $A^6$ is moved outwardly, and as it is connected by the rods $A^{11}$ with the support $A^5$ said latter support is moved so as to bring the brake-shoe $A^3$ into contact with the fixed part $A'$. The action of the two brake-shoes on the fixed part retards its movement, and thus stops the car. The force with which the brake is applied will of course depend upon the pressure admitted to the receptacle. When a sufficient amount of air is admitted to the receptacles $A^8$, the arm $O^2$ is moved back to the contact $O'$. The solenoid $B^2$ will then be cut out and the solenoid $B'$ connected in circuit. The valve will then be moved back by the spring S, so as to disconnect the brake from the source of air-supply, but not far enough to permit exhaust, thus holding the air in the receptacles. When it is desired to throw off the brakes, the arm $O^2$ is moved to a position to break the circuit through the controlling-valve. The spring S then moves the valve so as to connect the receptacles $A^8$ with the exhaust, thus allowing the air to be exhausted. The springs $A^{12}$, interposed between the brake-shoe $A^4$ and the support $A^5$, now act to move the parts back to the position shown in full lines in Fig. 3, thus freeing the brake-shoes from the fixed part on the axle. When several cars are connected, the circuits on each car will be the same as traced with relation to Fig. 1, with the exception that all the circuits pass through the movable arm on the car from which the several brakes are controlled. If, for example, all the brakes are operated by the movable arm on the front of the car, (shown at the right in Fig. 4,) the several circuits will pass through this arm, and when the arm is moved to contact O the circuit through the car on the left will be traced the same as the circuit hereinbefore traced with relation to Fig. 1 until we come to conductor $N^8$. The circuit instead of then passing through the arm $O^2$ on this car will pass along the conductor $N^8$ until it reaches the arm $O^2$ on the front car. The circuit will then pass to conductor $N^3$ and thence to the ground. It will thus be seen that the brakes on all the cars may be controlled from either end of either of the cars and that the valves will be operated simultaneously, so as to produce a simultaneous action of the brakes.

Any suitable pump may be used to fill the tank C with air. I have shown one form of pump in Fig. 6. This pump is electrically operated, and I have omitted the circuits from the other figures, so as to avoid confusion. If the parts are in the position shown in Fig. 6 and the circuit is completed, it will be traced as follows: from the trolley along conductor G to solenoid E, thence by conductor $G^4$ to contact $G^2$, thence through the end of the movable part H to contact $G^5$, thence through conductors $G^7$ and $G^8$ and motors $G^9$ to the ground. When the solenoid E is energized, it acts upon the plunger $E^2$ so as to move it in the direction of the arrow. This movement of the plunger forces air from the solenoid E and draws air into the solenoid F. When the plunger is moved so that the contact-arm $H^{10}$ completes the circuit between contacts $H^8$ and $H^4$, a circuit is completed through the coil $H'$ of the solenoid associated with the movable part H, the circuit being traced as follows: from the trolley to conductor G, thence by conductor $H^7$ through contacts $H^8$ and $H^4$, conductor $H^3$, coil $H'$, conductors $G^7$ and $G^8$, and motors $G^9$ to the ground. When the coil $H'$ is energized, the movable part H is moved so as to connect the contacts $G^6$ and $G'$. The circuit through the solenoid E is then broken and a circuit through solenoid F completed, which will be traced as follows: from the trolley through conductor G to solenoid F, thence through conductor $G^3$, contacts $G'$ and $G^6$, conductors $G^7$ and $G^8$, and motors $G^9$ to the ground. The plunger $E^2$ is then moved in the opposite direction, so as to force air from the solenoid F to the tank C and draw air into the solenoid E. When the plunger is moved far enough to complete the circuit between contacts $H^6$ and $H^9$, a circuit through the coil $H^2$ of the solenoid associated with the movable part H is completed and said movable part is moved to break the circuit between contacts $G'$ and $G^6$ and complete the circuit between contacts $G^2$ and $G^5$. The operation before described is then repeated. It will thus be seen that the plunger is reciprocated back and forth, so as to force air from the solenoids into the tank C. The regulating or cut-out device for the pump is also shown in Fig. 6 and operates as follows: When the pressure in the tank reaches a predetermined amount, the action of the air on the diaphragm $I^6$ moves the part I, so that the contact-arm $I'$ completes the circuit between the contacts $I^2$ and $I^3$. A circuit is then completed through the solenoid $J^5$, which is traced as follows: from the trolley through said solenoid to contacts $I^2$ and $I^3$, thence through conductors $G^7$ and $G^8$ and the motors to the ground. The solenoid then becomes energized and moves the plunger $J^4$ forward, so that the circuit is completed between contacts K and $K'$. The dog J is then forced outwardly by the spring $J^3$ and engages the face $J^6$ on the plunger $J^4$, holding said plunger in this position. A short circuit is then formed around the pump, which is traced as follows: from the trolley through conductor $K^2$, contacts K $K'$, conductors $G^7$ and $G^8$ to the motors, and thence to the ground. The pump will thus be stopped and no further air forced into the tank while the parts are in this position. As the pressure in the tank decreases the spring $I^5$ moves the part I upward, so as to disconnect the contacts $I^2$ and $I^3$ and break the circuit through the solenoid $J^5$. As the pressure in the tank continues to decrease the part I continues to move upward through the agency of the spring $I^5$ until the engaging piece $I^8$ strikes the dog J and disengages it from the face $J^6$ of the plunger. The spring $J^8$ then moves the plunger to the position shown in full lines and breaks the circuit between contacts K and $K'$. The pump is then again started and continues to operate until the proper pressure is obtained in the tank. If for any reason the current on the main line ceases, the switch M is brought into play to connect the source of electric supply on the car $N^5$ in circuit, so as to operate the controlling-valve. When the current in the main circuit ceases, the solenoid $M^6$ becomes deenergized and the spring $M^7$ moves the contact-arm $M'$ upward, so as to connect the contacts $M^8$. If now the contact-arm $O^2$ is moved to the contact O, the circuit will be traced as follows: from the battery $N^5$ to conductor $L'$, thence through the controlling-valve B, conductors L and $N^8$ to contact O, thence through contact-arm $O^2$, conductors $N^3$ and $N^2$, contacts $M^8$, and conductor $N^4$ back to the battery.

I claim—

1. A brake mechanism, comprising a fixed part on the car-axle, a movable brake-shoe opposed thereto, a support for said brake-shoe, a fluid-receptacle interposed between the support and the brake-shoe, said fixed part, brake-shoe and fluid-receptacle arranged in planes substantially parallel to each other and at right angles to the axle, and means for admitting fluid thereto so as to force the shoe against the fixed part.

2. A brake mechanism, comprising an annular part fixed to the axle of the vehicle so as to rotate therewith, a brake-shoe partly or wholly surrounding the axle and opposed to said annular part, a support to which said brake-shoe is movably attached, a fluid-receptacle between said support and said shoe, said fixed part, brake-shoe and fluid-receptacle arranged in planes substantially parallel to each other and at right angles to the axle, a source of fluid-supply adapted to be connected with said receptacle, and an electrically-controlled valve between the source of fluid-supply and said receptacle.

3. A brake mechanism, comprising a fixed part on the axle of each car, a brake-shoe partly or wholly surrounding the axle and opposed to said fixed part, a support to which said brake-shoe is movably attached, a receptacle between each support and its associated brake-shoe, said fixed part, brake-shoe and fluid-receptacle arranged in planes substantially parallel to each other and at right angles to the axle, a source of fluid-supply adapted to be connected with each of said receptacles, an electrically-controlled valve for admitting fluid into said receptacles, a controlling device located on one of said cars, and suitable electrical connections whereby the admission into all of said receptacles may be simultaneously controlled from one of said cars.

4. A brake mechanism, comprising a fixed part on the axle of each car, a brake-shoe partly or wholly surrounding the axle and opposed to said fixed part, a support to which said brake-shoe is movably attached, a receptacle between each support and its associated brake-shoe, said fixed part, brake-shoe and fluid-receptacle arranged in planes substantially parallel to each other and at right angles to the axle, a source of fluid-supply adapted to be connected with each of said receptacles, an electrically-controlled valve for admitting fluid into said receptacles, a controlling device located on each car, and suitable electrical connections whereby the admission into all of said receptacles may be simultaneously controlled from each car.

5. A braking device for vehicles, comprising a fixed part on the vehicle-axle, a laterally-movable brake-shoe opposed thereto, a support to which said brake-shoe is movably connected, a fluid-receptacle between said support and brake-shoe, said fixed part, brake-shoe and fluid-receptacle arranged in planes substantially parallel to each other and at right angles to the axle, a fluid-tank on the vehicle provided with connections leading to said receptacle, an electrically-controlled valve interposed between the tank and the receptacle, a switch and suitable electrical connections on the vehicle adapted to control said valve, and an electrically-operated pump for forcing fluid into said tank.

6. A braking device for vehicles, comprising a fixed part on the vehicle-axle, a laterally-movable brake-shoe opposed thereto, a support to which said brake-shoe is movably connected, a fluid-receptacle between said support and brake-shoe, said fixed part, brake-shoe and fluid-receptacle arranged in planes substantially parallel to each other and at right angles to the axle, a fluid-tank on the vehicle provided with connections leading to said receptacle, an electrically-controlled valve interposed between the tank and the receptacle, a switch and suitable electrical connections on the vehicle adapted to control said valve, an electrically-operated pump for forcing fluid into said tank, and an automatic cut-out for said pump.

7. A brake for vehicles, comprising a fixed part on the vehicle-axle, a brake-shoe partly or wholly surrounding the axle and opposed thereto, a support upon which said brake-shoe is movably mounted, a flexible fluid-receptacle interposed between the brake-shoe and the support, said fixed part, brake-shoe and fluid-receptacle arranged in planes substantially parallel to each other and at right angles to the axle, and means for admitting fluid into said fluid-receptacle so as to vary its shape and force the brake-shoe against the fixed part.

8. A brake for vehicles, comprising a fixed part on the vehicle-axle, a brake-shoe opposed thereto, a support upon which said brake-shoe is movably mounted, a flexible fluid-receptacle interposed between the brake-shoe and the support, said fixed part, brake-shoe and fluid-receptacle arranged in planes substantially parallel to each other and at right angles to the axle, means for admitting fluid into said fluid-receptacle so as to vary its shape and force the brake-shoe against the fixed part, and a heat-insulating part interposed between the flexible receptacle and the brake-shoe.

9. A brake for vehicles, comprising a fixed part on the vehicle-axle, a brake-shoe attached to some part of the car so as to be fixed against rotation and opposed thereto, a support upon which said brake-shoe is movably mounted, a fluid-receptacle interposed between said support and said brake-shoe, means for admitting fluid thereto so as to force the brake-shoe against said fixed part, a second brake-shoe opposed to said fixed part and connected with a suitable support, and a connection between the two supports, whereby the admission of fluid into said receptacle moves both brake-shoes into contact with the fixed part.

10. A brake for vehicles, comprising a fixed part on the vehicle-axle, two brake-shoes attached to some part of the car so as to be fixed against rotation and opposed to said fixed part and mounted upon suitable supports, a fluid-receptacle associated with one of said brake-shoes and its support and adapted, when connected with a source of fluid-supply, to move the two relatively, a connection between the two brake-shoes whereby the movement of one produces a movement of the other, so as to bring both brake-shoes into contact with the fixed part, and a separating device adapted to separate the brake-shoes when the fluid is exhausted from said receptacle.

11. A braking mechanism, comprising a fluid-controlled brake-shoe opposed to a fixed part on the axle, a fluid-supply and suitable connections leading to the brake-shoe, an electrically-controlled valve interposed between the fluid-supply and the brake-shoe and adapted to be connected in circuit with the source of electric supply, a controlling device for said valve located on the car, a reserve source of electric supply and an automatic switch adapted to connect said reserve source of electric supply in circuit with said valve when the main circuit is broken.

12. A braking mechanism, comprising a fluid-controlled brake-shoe partly or wholly surrounding the axle and opposed to a fixed part on the axle, said brake-shoe and fixed part arranged in extended parallel planes in close proximity to each other and substantially perpendicular to the axle, a fluid-supply, suitable connections leading from the fluid-supply to the brake-shoe, and an electrically-controlled valve interposed between said fluid-supply and brake-shoe and adapted to control the connections between them.

13. A brake mechanism, comprising a fixed part on the car-axle, a brake-shoe partly or wholly surrounding said axle and cut away at the center, a support for said brake-shoe, a flexible receptacle interposed between the support and the brake-shoe and adapted to be varied in position so as to move the brake-shoe laterally and uniformly, and means for admitting fluid to said receptacle so as to vary its shape, said fixed part, brake-shoe and fluid-receptacle arranged in planes substantially parallel to each other and at right angles to the axle, substantially as described.

ADOLPH G. CARLSON.

Witnesses:
DONALD M. CARTER,
HOMER L. KRAFT.